United States Patent Office 3,196,146
Patented July 20, 1965

3,196,146
PRODUCTION AND RECOVERY OF BENZYL DEXTRAN
Everette E. Witt, Miamisburg, Ohio, assignor to The Commonwealth Engineering Company of Ohio, Dayton, Ohio, a corporation of Ohio
No Drawing. Filed July 26, 1962, Ser. No. 212,723
3 Claims. (Cl. 260—209)

This invention relates to the production and recovery of benzyl dextran. More particularly, it relates to a method for the production and recovery of benzyl dextran especially suitable for production of delayed release medicaments, as well as for other purposes.

The production and recovery of benzyl dextran has been described by previous investigators, and in particular by G. L. Stahly—U.S. Patent No. 2,344,180, G. L. Stahly and W. W. Carlson—U.S. Patent No. 2,380,979, and G. L. Stahly—U.S. Patent No. 2,385,553. The production and recovery of benzyl dextran by any of these prior art processes has been both difficult and slow and the final product has not been suitable for certain purposes, notably for use in delayed release medicaments which require a relatively pure grade of benzyl dextran of a physical form which permits the formation of stable suspensions of medicaments and the regulated release of these medicaments for the benzyl dextran in the intestinal tract of the body. The process of the present invention gives a benzyl dextran having such characteristics and also useful in preparing other delayed release products, as well as for other purposes which will be obvious to those skilled in the art.

According to the previous processes for the production of benzyl dextran, aqueous suspensions of dextran, benzyl chloride and a stronge base such as sodium hydroxide have been heated at elevated temperatures ranging from 75 to 105° C. for periods of time ranging from 3 to 10 hours. In some processes the operation has been carried out in two steps, that is, the dextran was first heated with only part of the benzyl chloride and sodium hydroxide. After decanting the aqueous phase, the remainder of the benzyl chloride and sodium hydroxide were added to the residue and the heating repeated. At the end of the reaction the benzyl dextran residue was neutralized with acid, washed with water and dried under vacuum at elevated temperature. This process has the disadvantage of not giving a product of uniform properties, either as to molecuar weight or purity. In addition, the recovery is difficult, time-consuming and expensive. All of these disadvantages are overcome in the present process which permits the rapid production and recovery of a grade of benzyl dextran of predetermined characteristics and of excellent purity, whereas the prior art product was difficult to remove from the reaction kettle, required about 48 hours for complete drying and finally dried to a hard, horny mass which resists methods of reducing to a powder and retains 10–25% benzyl by-products as impurities.

The present process differs from the prior processes essentially in using a large excess of strong base in the production of the benzyl dextran and in a novel process for the recovery and purification of the formed benzyl dextran. A minimum of three, and preferably about six to eight moles of strong base per mole of dextran are used in the present process and a novel solvent process is employed for the removal of the benzyl dextran from the reaction kettle and subsequent purification.

The present process is applicable to the production of benzyl dextran from any of the various forms of either native or hydrolyzed dextran. The term "dextran" is applied to a class of polymers of glucose having chain-like structures and usually of very high molecular weight, produced by fermentation. The structure of dextran varies somewhat depending upon its method of production. For some purposes, the native dextran is first subjected to either acid or enzymatic hydrolysis to break down the dextran chain and give lower molecular weight dextrans. The present process of producing and recovering and purifying benzyl dextran can be satisfactorily applied to any of these various forms of dextran.

For use in preparing benzyl dextran suitable for delayed release medicament compositions dextran having a ratio of repating alpha-1,6 to alpha non-1,6 glycosidic links ranging from 2:1 to 32:1 has been found to be particularly suitable. The dextran used to produce synthetic blood-volume expanders falls within this range and has a ratio of repeating alpha-1,6 to alpha non-1,6 glycosidic links of 19:1.

The molecular weight of the native dextrans is very high. The molecular weight of the dextran used in making benzyl dextran for delayed release medicaments falls within the range of 3 million to 60 million, which is the average molecular weight range for most of the dextrans obtained by normal fermentations. In making benzyl dextran for delayed release medicaments dextrans of lower molecular weight are used when a medicament of increased rate of release is desired and a higher molecular weight dextran is employed for reduced rate of release. Where it is desired to speed up release or to obtain a benzyl dextran of special properties for other purposes this may be done using a native dextran which has been subjected to controlled hydrolysis to give a dextran of any particular molecular weight.

The characteristics of the benzyl dextran can also be varied by regulating the degree of benzylation to which the dextran is subjected. When used in delayed release medicaments, the rate of release of the medicament from the benzyl dextran-medicament composition can be increased by using a benzyl dextran having a low benzyl substitution (D.S.). Conversely, the rate of release can be decreased by using a benzyl dextran having a higher degree of benzyl substitution. For most types of delayed release medicaments, benzyl dextrans having a degree of substitution (D.S.) ranging from 0.8 to 1.0 have been found to be most desirable, a D.S. below 0.8 giving too fast release of the medicament and about 1.0 not giving fast enough. For some purposes, however, benzyl dextran having a D.S. outside of this range are useful.

Benzyl dextran is produced according to the present invention by reacting a benzyl halide (Cl, Br, or I) with dextran in the presence of a strong base NaOH, KOH) in an aqueous system. Benzyl chloride is the preferred benzyl compound and sodium hydroxide is the preferred base.

To produce a benzyl dextran having a benzyl D.S. of 0.8 to 1.0 a native dextran, preferably that produced by the culture designated as Leuconostoc Mesentercides B 512 (NRRL) and having a ratio of repeating alpha-1,6 to alpha non-1,6 glycosidic linkages ranging from 2:1 to 32:1. This is reacted with 3–5 moles by weight of benzyl chloride, 6–8 moles by weight of sodium hydroxide and 75–100 moles of water per mole of dextran. The dextran is first dissolved in the water, one-half of the required amount of sodium hydroxide added, as a 40% aqueous solution, and the resulting solution heated to 90° C. with constant stirring. At this temperature one-third of the benzyl chloride is slowly added and the resulting mixture heated under reflux at 95–110° C. until the odor of benzyl chloride is no longer detected. During this period the partially substituted benzyl dextran separates as an insoluble soft gum. A volume of water equal to the total volume of reactants is then added to the reaction vessel, the mixture thoroughly agitated, the gum permitted to settle and the liquid phase removed by decantation.

This operation reduces the concentration of by-products produced in this step of the operation.

The second half of the sodium hydroxide in 40% aqueous solution is then added to the soft gum remaining in the reaction vessel and the mixture heated to 90° C. A second one-third portion of the benzyl chloride is next added and the mixture heated under reflux at 95–100° C. until the odor of benzyl chloride is no longer detected. The remaining one-third of the benzyl chloride is then added and refluxing continued until all of the benzyl chloride has been reacted or removed.

The reaction periods will vary directly with the quantities of reaction products. A reaction mixture containing two moles of dextran will normally require refluxing about thirty minutes, while one containing 10 moles of dextran will usually require refluxing for approximately one hour to complete the reaction.

During the benzyl dextran synthesis, some concurrent side-reactions occur. Benzyl alcohol is produced by the action of the aqueous alkali on the benzyl chloride. Benzyl ether also appears to be formed during the reaction. In the later stages of the synthesis, and during drying, benzaldehyde and benzyl ether appear to be formed. Benzyl alcohol being a good solvent for benzyl dextran, separation of the benzyl alcohol, as well as the other benzyl impurities, from the gummy, resinous benzyl dextran has been found to be exceeding difficult by previous processes.

In separating and purifying the benzyl dextran by the present process, at the end of the reaction described above the benzyl dextran is allowed to settle and the aqueous phase decanted. An amount of hot water approximately equal to the volume of the total reaction mixture is then added to the benzyl dextran gum in the reaction vessel and thoroughly agitated therewith. The benzyl dextran gum is then permitted to settle, the water decanted. This washing operation with hot water is repeated 5–6 times in order to remove the sodium hydroxide and some of the other water-soluble impurities.

After decanting the final wash water from the benzyl dextran gum in the reaction vessel, the benzyl dextran gum is dissolved in the reaction vessel by the addition of an isopropyl alcohol-miscible solvent for the benzyl dextran and impurities present therewith. Suitable solvents for this purpose have been found to be the glycol ethers such as the monomethyl ether of ethylene glycol, the monoethyl ether of ethylene glycol, the monobutyl ether of ethylene glycol and higher homologues thereof. From the point of view of ease of removal and low toxicity, the monoethyl ether of ethylene glycol has been found especially suitable, being less toxic than the monomethyl ether of ethylene glycol and having a lower vapor pressure than its higher homologues.

After solution of the benzyl dextran gum in the reaction vessel the solution may be filtered if desired. However, both the benzyl dextran and the impurities normally present will be completely dissolved. If solution is complete, the remaining step of the operation may be carried in the reaction vessel, or the solution may then be transferred to other convenient vessel. Preferably, the solution is poured into an excess of substantially anhydrous isopropanol with sufficient agitation to break up the benzyl dextran into small particles as it precipitates from the solution. The granular or powdery precipitate is then isolated by filtration and washed free from the ethylene glycol solvent which retains the benzyl impurities, by repated washings with 99% isopropanol. The filter cake of benzyl dextran is then dried in vacuo at room temperature for twenty-four hours.

The dry benzyl dextran powder produced as above described in a white free-flowing powder and contains less than 1% benzyl impurities. It is insoluble in aliphatic and aromatic hydrocarbons and is generally insoluble in alcohols, including polyhydric alcohols, aldehydes, ketones, esters, ethers and organic halides, although a few of these will soften the benzyl dextran resin. The method of production and recovery employed permits the production of benzyl dextran of predetermined molecular weight since substantial hyrolysis of the dextran molecule which may take place during the benzylation and subsequent recovery and purification can be avoided. By starting with a dextran of desired molecular weight and regulating the proportion of the reactants and the reaction conditions a benzyl dextran of desired molecular weight, degree of benzylation and other properties can be obtained.

The specific examples which follow will illustrate the new and improved method of producing and recovering and purifying benzyl dextran which is the subject of the present invention. It is to be understood, however that these examples are to be regarded as illustrative only and that the operating conditions set forth therein can be varied somewhat without departing from the scope of the claimed improvement.

*Example I*

One mole (162 gm.) of native 512 dextran was dissolved in 75 moles (1350 ml.) of water and heated to 85° C. Concentrated hydrochloric acid was then added in sufficient amount to give a pH of 1.0. The resulting solution was stirred at 85° C. for a predetermined time sufficient to permit the dextran to be hydrolyzed to a molecular weight of 650,000 to 850,000 as determined by light scattering.

Six moles (240 gm.) of sodium hydroxide were then added in the form of a 40% aqueous solution while maintaining the temperature below 90° C.

Five moles (630 gm.) of benzyl chloride were then added at 90° C. and the resulting mixture refluxed for about 2 hours until the odor of benzyl chloride was very faint.

The excess alkali was then neutralized by adding 2N hydrochloric acid to the reaction mixture while vigorously agitating, the gum permitted to settle and the aqueous phase decanted.

Sufficent monoethyl ether of the ethylene glycol was then added to the reaction vessel to dissolve the gum residue. The resulting solution was then decanted and poured with stirring into an excess of isopropanol and the benzyl dextran thereby precipitated. After washing with substantially anhydrous isopropanol and drying in vacuo at room temperature the benzyl dextran was recovered in the form of substantially pure, while, free-flowing amorphous particles.

*Example II*

One mole (162 gm.) of native 512 dextran was dissolved in 75 moles (1350 ml.) of water.

Six moles (240 gm.) of sodium hydroxide was then added in the form of a 40% aqueous solution and the resulting solution heated to 90° C.

Four moles (504 gm.) of benzyl chloride were then added and the resulting mixture refluxed at 95–100° C. for two hours until the odor of benzyl chloride was very faint.

The separated benzyl dextran gum was then washed free of excess alkali by repeatedly washing with 75 moles of water.

After decanting the last wash water the benzyl dextran gum remaining in the reaction vessel was dissolved in monoethyl ether of ethylene glycol and the resulting solvent solution removed from the reaction vessel and poured with stirring into an excess of ispropanol. The precipitated benzyl dextran was then recovered and dried as described in Example I.

*Example III*

One mole (162 gm.) of native 512 dextran was dissolved in 75 moles (1350 ml.) of water and four moles (160 gm.) of sodium hydroxide added in the form of a 40% aqueous solution. The resulting mixture was then heated to 90° C. with constant stirring. At this temperature 1⅔ moles (210 gm.) of benzyl chloride was slowly added and the resulting mixture heated under reflux at 95–100° C. until the odor of benzyl chloride was no longer detected. After separation of the gum and decantation of the aqueous phase, a volume of water equal to the total volume of the reactants was then added, the mixture thoroughly agitated, the gummy reaction product permitted to settle and the liquid phase removed by decantation.

Four moles (160 gm.) of sodium hydroxide in the form of a 40% aqueous solution was then added to the soft gum remaining in the reaction vessel and the resulting mixture heated to 90° C. One and two-thirds moles (210 gm.) of benzyl chloride was then added and the resulting mixture heated under reflux at 95–100° C. until the odor of benzyl chloride was no longer detected. One and two-thirds moles (210 gm.) of benzyl chloride was then added to the reaction mixture and the refluxing continued until the odor of benzyl chloride was no longer detected.

After permitting the gummy reaction product to settle, the aqueous phase was decanted and a volume of hot water equal to the volume of the total reaction mixture was then added to the benzyl dextran gum in the reaction vessel, the resulting mixture thoroughly agitated, the gum permitted to settle, and the aqueous phase decanted. This operation was repeated five times.

After decanting the final wash water, the benzyl dextran gum was then dissolved in the reaction vessel by the addition of monoethyl ether of ethylene glycol. The resulting solution was then poured into an excess of substantially anhydrous isopropanol, the resulting precipitate of benzyl dextran recovered by filtration, washed with substantially anhydrous isopropanol and the resulting filter cake dried in vacuo at room temperature for twenty-four hours.

The benzyl dextran produced as above described may be used for numerous purposes, and is particularly useful in the production of delayed release medicaments.

Now having described the invention, what is claimed is:

1. In a process for the production of benzyl dextran by the reaction of dextran with a benzyl halide in the presence of a strong base, the improvement which consists in recovering the benzyl dextran in substantially pure particulate form by dissolving the reaction products in a monoether of ethylene glycol and in precipitating substantially pure benzyl dextran from said solution by mixing isopropanol therewith.

2. In a process for the production of benzyl dextran by the reaction of dextran with a benzyl halide in the presence of a strong base, the improvement which consists in recovering the benzyl dextran in substantially pure particulate form by washing the crude benzyl dextran reaction product with water, dissolving the washed crude benzyl dextran reaction product in the monoethyl ether of ethylene glycol and precipitating benzyl dextran from said monoethyl ether of ethylene glycol solution of dextran by isopropanol.

3. In a process for the production of substantially pure benzyl dextran by the reaction of dextran with a benzyl halide in the presence of a strong base, the improvement which consists in the step-wise reaction of a total of 3 to 5 moles of a benzyl halide per mole of dextran in the presence of a total of 3–8 moles of a strong base per mole of dextran, washing with water the gummy reaction product, dissolving in the monoethyl ether of ethylene glycol the said washed gummy reaction product, and recovering from said solution substantially pure benzyl dextran in particulate form by precipitating with isopropanol.

References Cited by the Examiner

UNITED STATES PATENTS

| | | | |
|---|---|---|---|
| 2,385,553 | 9/45 | Stahly | 260—209 |
| 2,734,828 | 2/56 | Toulmin | 260—209 X |
| 2,914,415 | 11/59 | Bishop | 260—209 |
| 3,063,906 | 11/62 | Heckel et al. | 260—209 |

LEWIS GOTTS, *Primary Examiner.*

CHARLES B. PARKER, *Examiner.*